(12) United States Patent
Houston (10) Patent No.: US 10,073,827 B2
(45) Date of Patent: Sep. 11, 2018

(54) METHOD AND SYSTEM TO GENERATE A PROCESS FLOW DIAGRAM

(76) Inventor: Robert Kevin Houston, Orlando, FL (US)

( * ) Notice: Subject to any disclaimer, the term of this patent is extended or adjusted under 35 U.S.C. 154(b) by 677 days.

(21) Appl. No.: 13/491,080

(22) Filed: Jun. 7, 2012

(65) Prior Publication Data

US 2013/0332812 A1  Dec. 12, 2013

(51) Int. Cl.
  *G06F 17/21* (2006.01)
  *G06F 17/27* (2006.01)
  *G06Q 10/06* (2012.01)
  *G06Q 10/10* (2012.01)

(52) U.S. Cl.
  CPC ...... *G06F 17/2725* (2013.01); *G06F 17/2765* (2013.01); *G06Q 10/06* (2013.01); *G06Q 10/10* (2013.01)

(58) Field of Classification Search
  CPC ......... G06F 17/21; G06F 17/211; G06F 17/30
  See application file for complete search history.

(56) References Cited

U.S. PATENT DOCUMENTS

| | | | | |
|---|---|---|---|---|
| 5,111,398 A | * | 5/1992 | Nunberg et al. | 704/9 |
| 5,555,169 A | * | 9/1996 | Namba et al. | 704/9 |
| 5,966,686 A | * | 10/1999 | Heidorn et al. | 704/9 |
| 6,587,132 B1 | * | 7/2003 | Smethers | 715/858 |
| 6,625,608 B1 | * | 9/2003 | Watanabe | |
| 7,174,536 B1 | * | 2/2007 | Kothari et al. | 717/109 |
| 8,452,851 B2 | * | 5/2013 | Kabiljo et al. | 709/218 |
| 2002/0007483 A1 | * | 1/2002 | Lopez | 717/3 |
| 2002/0059333 A1 | * | 5/2002 | Tribbeck | 707/500 |
| 2002/0152203 A1 | * | 10/2002 | Ostergaard et al. | 707/3 |
| 2003/0033288 A1 | * | 2/2003 | Shanahan et al. | 707/3 |
| 2003/0061200 A1 | * | 3/2003 | Hubert et al. | 707/3 |
| 2004/0044964 A1 | * | 3/2004 | Martens et al. | 715/517 |
| 2004/0205667 A1 | * | 10/2004 | Hsu | 715/531 |
| 2004/0217944 A1 | * | 11/2004 | Kong | 345/173 |
| 2005/0120011 A1 | * | 6/2005 | Dehlinger et al. | 707/3 |
| 2007/0055491 A1 | * | 3/2007 | Manson et al. | 704/9 |
| 2008/0133591 A1 | * | 6/2008 | Bookman et al. | 707/104.1 |
| 2009/0251488 A1 | * | 10/2009 | Clavel | 345/619 |
| 2010/0287163 A1 | * | 11/2010 | Sridhar | G06Q 30/02 707/740 |
| 2010/0325491 A1 | * | 12/2010 | Kumanan et al. | 714/38 |

(Continued)

*Primary Examiner* — Scott T Baderman
*Assistant Examiner* — Sookil J Lee
(74) *Attorney, Agent, or Firm* — Matthew G. McKinney, Esq.; Allen, Dyer et al.

(57) ABSTRACT

A method to generate a process flow diagram is disclosed. The method includes receiving a textual description of a process at a remote terminal from an originating user, where the textual description includes one or more activities. The method also includes transmitting the textual description of the process to network servers using a network and analyzing the textual description at the network servers using an analysis module to detect whether there is an error in the textual description of the process. In addition, the method includes generating an annotated textual description according to a set of predefined rules that corrects any known errors that were detected in the textual description and generating a process flow diagram from the annotated textual description using a graph generation module. Further, the method includes transmitting the process flow diagram to the originating user using the network.

21 Claims, 9 Drawing Sheets

(56) References Cited

U.S. PATENT DOCUMENTS

2012/0005238 A1\* 1/2012 Jebara et al. .................. 707/798
2013/0013454 A1\* 1/2013 Sears .......................... 705/26.41
2013/0204940 A1\* 8/2013 Kinsel et al. .................. 709/204

\* cited by examiner

*FIG. 1*

| Sentence | Diagram DSL | Errors | Diagram Visualization |
|---|---|---|---|
| A bank customer gives a transaction to the bank teller. | [A bank customer] gives {a transaction} to [the bank teller] | None | |
| The bank teller processes the transaction and records it in the bank system. | [The bank teller] processes {the transaction}, [The bank teller] records {the transaction} in [the bank system] | None | |
| The bank teller gives a transaction receipt to the bank customer. | [The bank teller] gives {a transaction receipt} to [the bank customer] | None | |

*FIG. 2*

1. A bank customer gives a transaction to the bank teller.

FIG. 3

2. The bank teller processes the transaction and records it in the bank system.

FIG. 4

3. The bank teller gives a transaction receipt to the bank customer.

| Sentence | Diagram DSL | Error | Suggestion DSL |
|---|---|---|---|
| The transaction is given to the bank teller by the customer | | Passive Voice | [the customer] gives {the transaction} to [the bank teller] |
| A bank customer gives a transaction to the bank teller. | [A bank customer] gives {a transaction} to [the bank teller] | None | |
| The customer calls the bank manager on the phone. | | Missing Object | [The customer] places a phone call to [the bank manager] |
| The customer places a phone call to the bank manager. | [The customer] places {a phone call} to [the bank manager] | None | |

FIG. 8

| Sentence | Diagram DSL | Errors | Diagram/Visualization |
|---|---|---|---|
| If the bank teller identifies an error with the transaction, then he returns it to the bank customer. | IF: [the bank teller] identifies {an error with the transaction}, THEN: [the bank teller] returns {the transaction} to [the bank customer] | None |  |
| Otherwise, the bank teller processes the transaction and records it in the bank system. | ELSE: [the bank teller] processes {the transaction}, [the bank teller] records {the transaction} in [the bank system] | None |  |

METHOD AND SYSTEM TO GENERATE A PROCESS FLOW DIAGRAM

I. FIELD OF THE INVENTION

The present invention relates generally to a method and system to generate process flow diagrams.

II. BACKGROUND

Business transactions typically include several steps or activities. The activities may be broken down into a series of textual description and visualized using a process flow diagram. For example, a business transaction between a bank customer and a bank teller may consist of several activities or steps when making a deposit. Each activity can be visualized with an association link to another activity.

In the past, flow diagram tools have been used to help visualize a process and the activities. Diagrams are useful in identifying errors and omissions in the process and to detect inefficiencies and redundancies. However, properly developing process flow diagrams from textual descriptions and to identify problems within the process can be tedious and time consuming.

Computer programs may be used to simplify the complexity of developing process diagrams from textual descriptions. A recent approach is premised on the process being modeled as one or more linked steps or activities that collectively describe the process. The process is typically within the context of an organizational structure defining functional roles and relationships. A flow direction defines the interaction of the activities. During this flow, documents, information, or tasks are passed from one person to another for action. The computer software allows a user to represent flows as a connected series of activities or steps. Interconnection between the activities represents the exchange of information. However, a shortcoming of identifying errors in the visual process flow diagram is that the error and omissions may be overlooked. In addition, it is time consuming to generate a process flow diagram from a textual description of a complex process that may include several conditional factors.

Accordingly, there is a need in the art for an improved method and system to generate process flow diagrams that is easy to visualize and use. There is a further need for identifying logical errors and omissions within the textual description of a process before developing the process flow diagram.

IV. SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

A method and system to generate a process flow diagram is disclosed. The method includes receiving a textual description of a process from an originating user at a remote terminal, where the textual description includes one or more activities. In addition, the method includes transmitting the textual description of the process to network servers using a network, analyzing the textual description at the network servers using an analysis module to detect whether there is an error in the textual description of the process, and generating an annotated textual description according to a set of predefined rules that corrects any known errors that were detected in the textual description. The method also includes generating a process flow diagram from the annotated textual description using a graph generation module and transmitting the process flow diagram to the originating user using the network.

In another particular illustrative embodiment, a system to generate a process flow diagram is disclosed. The system includes computer-readable program code means for receiving a textual description of a process from an originating user at a remote terminal, where the textual description includes one or more activities. The system also includes computer-readable program code means for transmitting the textual description of the process to network servers using a network and for analyzing the textual description at the network servers using an analysis module to detect whether there is an error in the textual description of the process. In addition, the system includes computer-readable program code means for generating an annotated textual description according to a set of predefined rules that corrects any errors that were detected in the textual description, computer-readable program code means for generating a process flow diagram from the annotated textual description using a graph generation module, and computer-readable program code means for transmitting the process flow diagram to the originating user using the network.

Other aspects, advantages, and features of the present disclosure will become apparent after review of the entire application, including the following sections: Brief Description of the Drawings, Detailed Description, and the Claims.

VI. DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The method and system to generate process flow diagrams includes a primary processing portion that is used to identify sentences within a paragraph, perform database search and retrieval of annotations, and diagram construction from annotations. Another portion of the method and system to generate process flow diagrams includes a secondary processing portion that is used for on-going database maintenance that may be performed manually by process experts or automatically. Modules of the method and system may include a sentence identifier module, language parser module, an annotation search and retrieval module, a graph generator module, a graph visualizer module, a database maintenance module, or any combination thereof.

The input to the method and system is a textual process flow description, represented as a paragraph of text. Each sentence in the paragraph is a likely candidate for being a "flow step" in a process. Each sentence is processed individually, and the processing results for each sentence are combined to produce the final output.

There are sophisticated methods for identifying sentences within a paragraph that currently exist. However, in the preferred embodiment the method and system uses a simplified method of locating the punctuation such as periods, question marks, and exclamation points, for example, that appear in the paragraph to decide where one sentence ends, and the next begins. In addition, alternative methods may be used to identify sentence boundaries that are currently under development.

The method and system to generate process flow diagrams includes searching a database to retrieve "expert annotations" for each sentence in the process flow description. If the database does not contain annotations for every sentence in the process flow description, or a syntactically similar sentence, then the method and system records which sentences are missing their corresponding annotations. A process expert may manually add these missing annotations to the database as part of an on-going database maintenance operation or the database may be updated and maintained automatically. The process expert is a person with expert knowledge in the art of writing process flow descriptions and generating process flow diagrams.

In a particular illustrative example of the method and system to generate a process flow diagram, the textual description of a process may be as follows:

A bank customer gives a transaction to the bank teller. The bank teller processes the transaction and records it in the bank system. The bank teller gives a transaction receipt to the bank customer.

Figure 1:
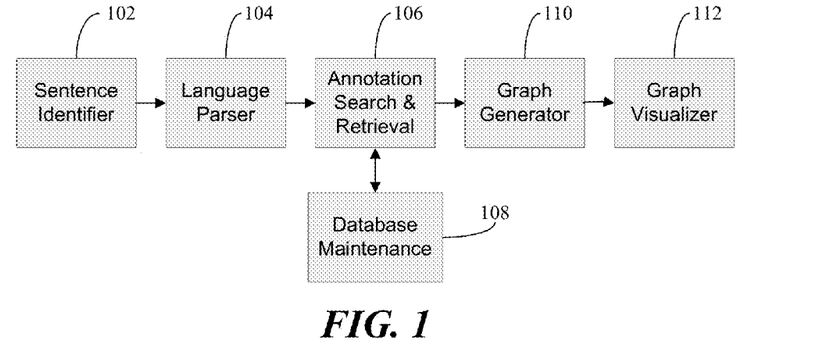
FIG. 1 is a block diagram of a particular illustrative embodiment of a method and system to generate process flow diagrams.
Figure 2:
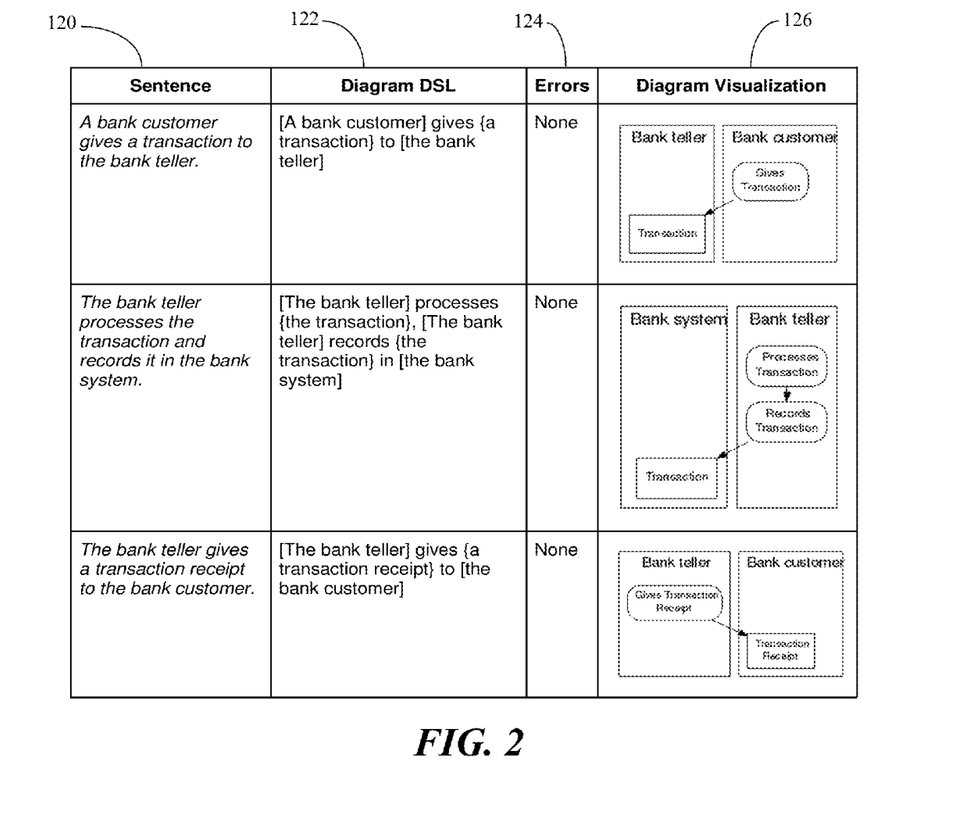
FIG. 2 is an example of a breakdown of a textual description of a process into a diagram visualization of each step.

As illustrated in FIG. 2, the first column 120 contains the first sentence of the textual description. The second column 122 contains the domain specific language ("DSL") annotation for the first sentence. The adjacent third column 124 indicates whether there were any errors, and the fourth column 126 shows the diagram visualization of the first sentence. The second and third sentences are each processed in a similar fashion as illustrated in FIG. 2.

The database search is optimized using a set of predefined rules to find "syntactically similar" sentences in the database. This feature allows the same "expert annotations" to be applied to the processing of other sentences that are similar to the specific sentences that were annotated by a process expert. An "expert annotation" is diagram DSL that correlates to a particular flow step (or sentence). To illustrate how this search method works, "parse trees" are used to facilitate the identification of syntactically similar sentences.

Figure 3:
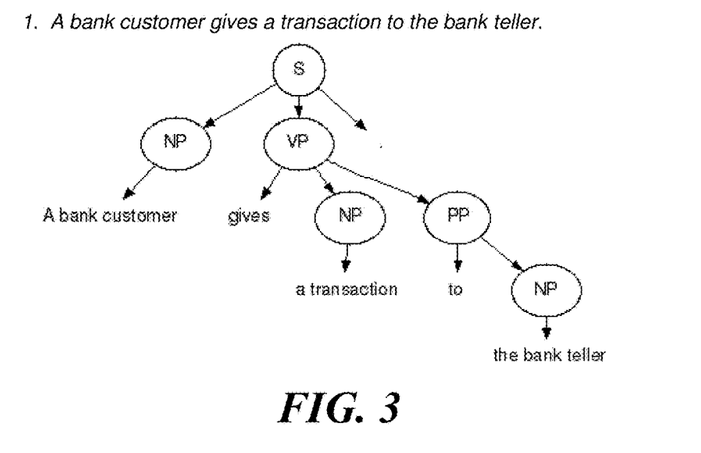
FIG. 3 is a parse tree symbolizing a textual description of a first step of a process.
Figure 4:
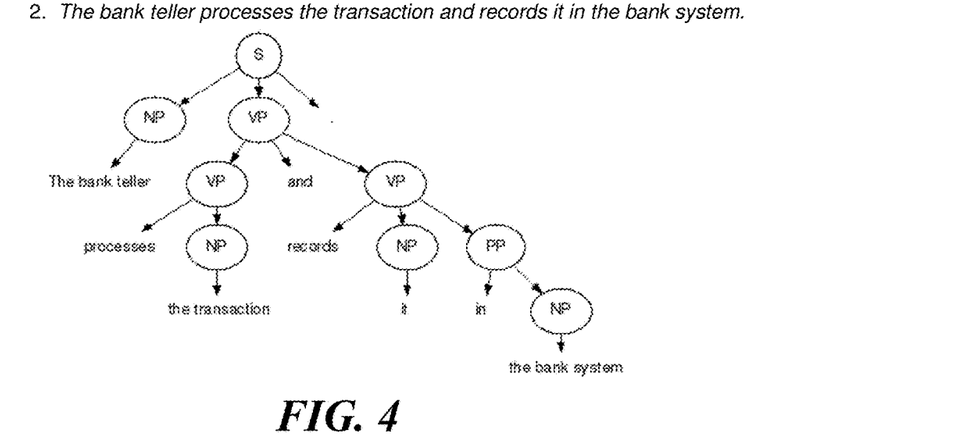
FIG. 4 is a parse tree symbolizing a textual description of a second step of a process.
Figure 5:
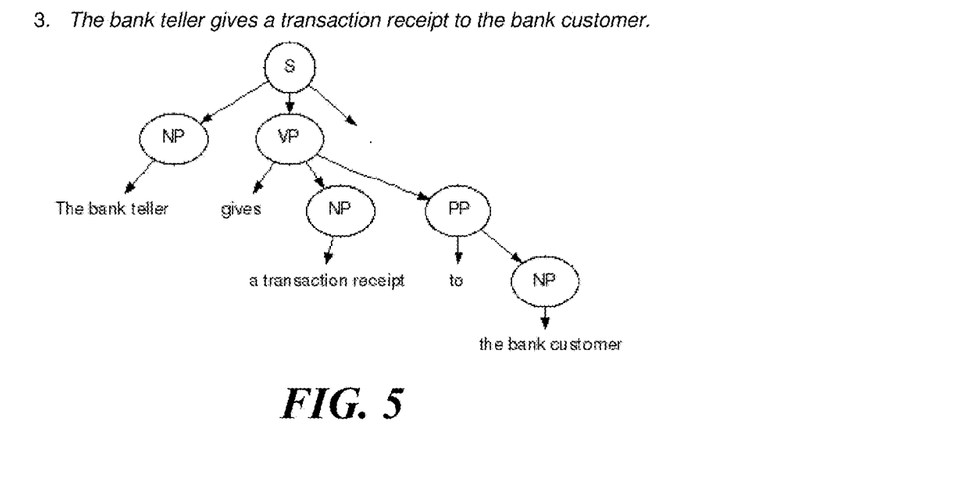
FIG. 5 is a parse tree symbolizing a textual description of a third step of a process.

Parse tree diagrams for each sentence in the above example are shown in FIGS. 3-5. The diagrams illustrate how the sentences (S) are constructed from noun phrases (NP), verb phrases (VP), prepositional phrases (PP), and other parts of speech.

In this example, sentence 1 (FIG. 3) and sentence 3 (FIG. 5) are syntactically similar to each other, since both sentences contain the same arrangement of noun phrases, verb phrases, and prepositional phrases. Sentence 2 (FIG. 4) is not syntactically similar to either sentence 1 or 3.

The parse trees shown in FIGS. 3-5 may be produced by an English language parser, such as the Link Grammar Parser, for example, by Davy Temperley, Daniel Sleator, and John Lafferty from Carnegie Mellon University. The Link Grammar Parser assigns a syntactic structure to a given sentence which consists of a set of labeled links connecting pairs of words. The parser also produces a "constituent" representation of a sentence to show noun phrases, verb phrases, etc.

Figure 6:
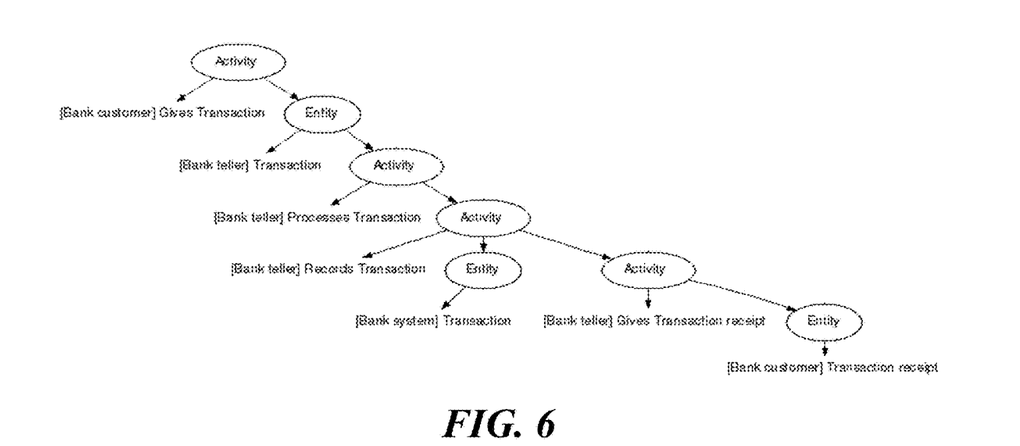
FIG. 6 is a graph representation of a flow of a process.

Referring now to FIG. 6, the individual annotations which are retrieved from the database are combined to produce the complete process flow diagram. The diagram construction process is performed in two steps; graph generation, and graph visualization.

The graph generator module uses the expert annotations as input, and creates a "graph representation" of the entire process flow paragraph as shown in FIG. 6. The generated "graph" is a data structure within the system and method that represents the arrangement of the flow diagram elements, which are the steps in the process flow, and the arrows that connect the boxes. The flow diagram elements generated by the system are the "actors", the "activities", and the "objects", which are collectively used by the system to generate the "arrows" and "boxes" on a process flow diagram.

The processing includes collecting the expert annotations from the database for each sentence in the paragraph as the graph is generated from the process flow description. Sentences for which an annotation is not found in the database, is not included in the generated graph. The annotation for each sentence is attempted to be connected to the annotation for the following sentence to create a complete beginning-to-end process flow graph. Any errors that may result when two adjacent sentences could not be connected in the graph are identified. After the graph is generated, it is transformed into a textual description that is used as the input to the graph visualizer module.

Figure 7:
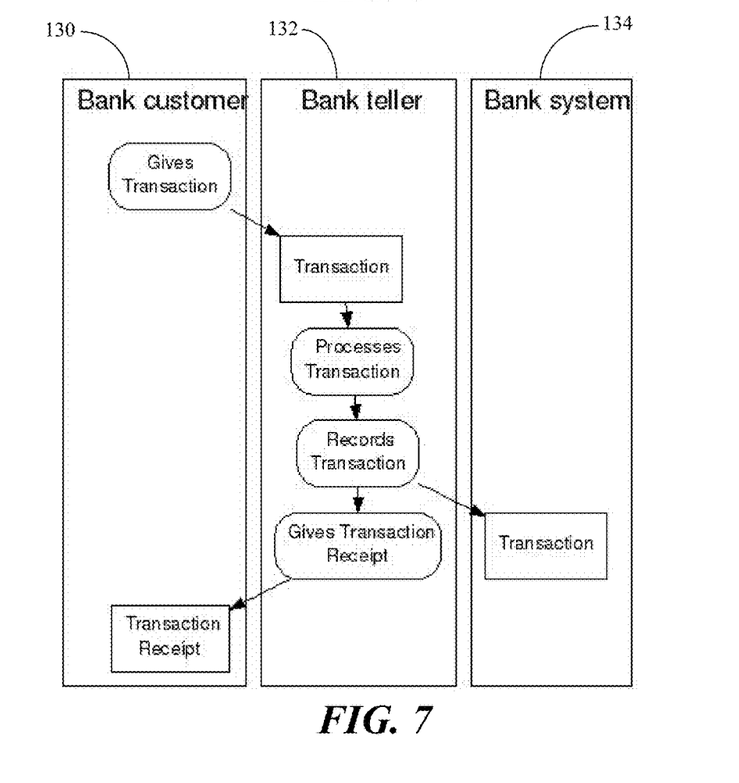
FIG. 7 is a diagram of a process generated from a graph visualizer.

Referring now to FIG. 7, the graph visualizer module may use a publicly available graph layout and drawing software, such as Graphviz, for example, which is an open source graph visualization software. Graph visualization is a way of representing structural information as diagrams of abstract graphs and networks. The Graphviz software takes descriptions of graphs in a simple text language, and makes diagrams in useful formats, such as images and scalable vector graphics (SVG) for web pages, PDF or postscript for inclusion in other documents; or display in an interactive graph browser. In the example, a bank customer 130 actor is shown in the first column. The second column is a bank teller 132 actor and the third column is a bank system 134 actor. The first step in the process is that the bank customer 130 gives a transaction to the bank teller 132. The action of giving the transaction to the bank teller 132 is represented by text "Gives Transaction" within a rounded rectangle shape. The information of the transaction is represented by the text "Transaction" within a rectangle shape and placed in the bank teller 132 actor. An association link between the "Gives Transaction" and "Transaction" is represented by a line connecting the two shapes and an arrow representing the flow of the process. Continuing on, the next step is that the bank teller 132 processes the transaction. This action is represented by the text "Processes Transaction" within a rounded rectangle shape. The next action in the process is that the bank teller 132 records the transaction and is represented by the text "Records Transaction" within a rounded rectangle shape. At this point in the process, the "Transaction" is placed within the bank system 134 actor and additionally the bank teller 132 takes another step and "Gives Transaction Receipt" to the bank customer 130. An association link is shown between the "Records Transaction" activity and the "Transaction" within the bank system 134 actor indicating that the "Transaction" is moved to the bank system 134. In addition, an association link is shown between the "Records Transaction" activity and the "Gives Transaction Receipt" activity indicating the direction of the process flow. The final activity in the process is the bank teller 132 gives the transaction receipt to the bank customer 130. This is shown by a rounded rectangle shape with the text "Gives Transaction Receipt" within the bank teller 132 actor. A rectangle shape with the text "Transaction Receipt" is in the bank customer 130 actor indicating that the bank customer 130 is provided with the transaction receipt. An association link points from the activity of "Gives Transaction Receipt" to the "Transaction Receipt" rectangle shape indicating the direction of the process.

Figure 8:
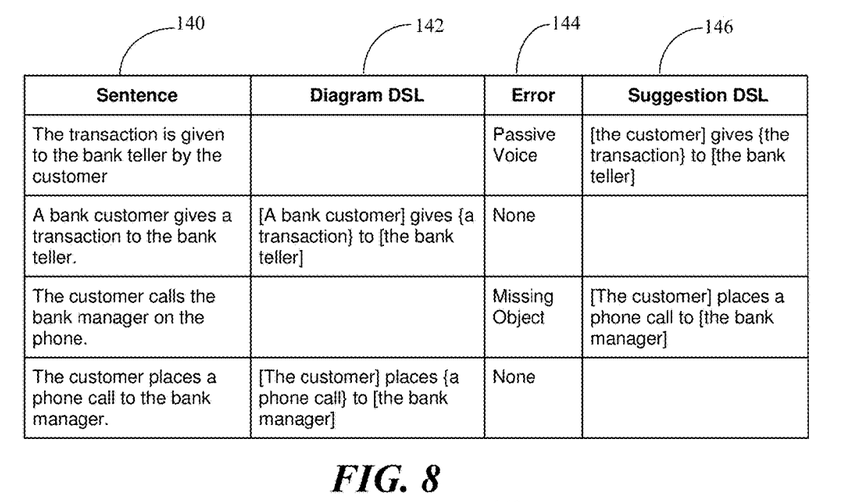
FIG. 8 is an example of a breakdown of a textual description of a process into a diagram visualization of each step indicating an error.

Referring now to FIG. 8, the database stores the annotations that are manually produced by a process expert or that are automatically produced when analyzing a sentence from a process description. The annotations may be either a description of a flow diagram, such as a process flow diagram, which corresponds to the sentence, an identification of an error in the phrasing of the sentence, or a suggested revision to the sentence, or any combination thereof. The description of a flow diagram, and the suggested revision, are represented in a domain specific language ("DSL"), which may be input into the database by the process experts or completed automatically. As illustrated in FIG. 8, a first column 140 includes the sentences of a textual description of a process. The second column 142 includes the DSL to generate a diagram visualization for each sentence that does not contain errors. The third column 144 indicates whether there is an error in the respective sentence, and the fourth column 146 is the DSL of the suggested revision to the sentence when an existing annotation is not located in the database, or the sentence contains an error.

The method and system domain specific language is constructed in a manner that allows the process expert to easily indicate which phrases in the specified sentence should be used to create a process flow diagram, and/or a suggested revision to the sentence. The DSL for the sentence is constructed from the sentence by removing the existing punctuation, and adding DSL specific punctuation, as described below.

For example, the DSL may specify the use of square-brackets "[ ]" to delimit the phrases that represent the "actors" in the process flow description. An actor is any of the following that performs an activity: a department or organization, a functional role, a job title, etc. The DSL may specify the use of curly-braces "{ }" to delimit phrases that represent the "objects" and the "activities" in the process flow description. An object is any of the following, which are passed from one actor to another actor: an object, entity, or data. An activity is a function or action that is performed by an actor.

In a particular illustrative example of the method and system to generate a process flow diagram, the textual description of a process may be as follows:

A bank customer gives a transaction to the bank teller. If the bank teller identifies an error with the transaction, then he returns it to the bank customer. Otherwise, the bank teller processes the transaction and records it in the bank system. The bank teller gives a transaction receipt to the bank customer.

Figure 9:
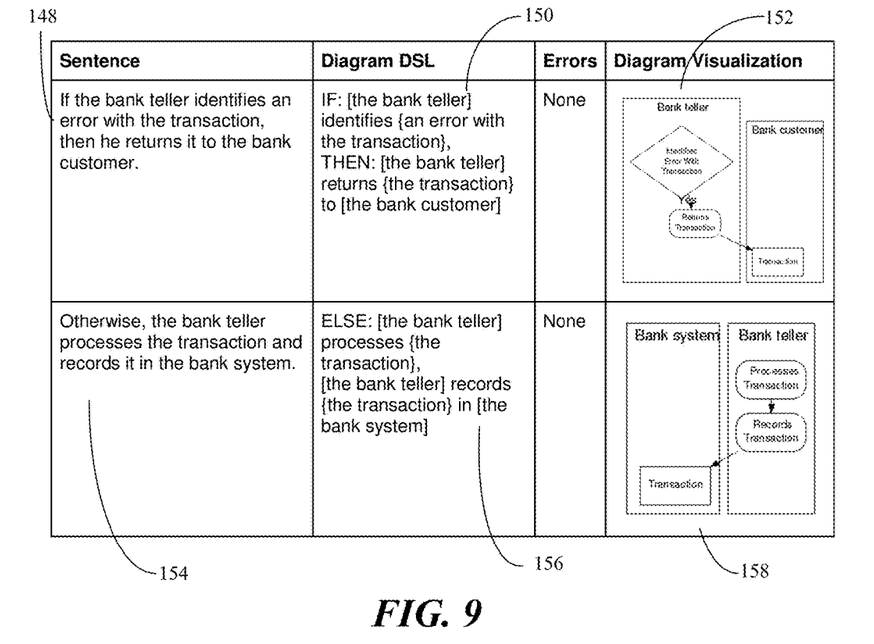
FIG. 9 is an example of a breakdown of a textual description of the process of FIG. 8 including domain specific language for each step.

In sentences that describe a flow step that is a conditional statement (IF-THEN statement), the DSL specifies the use of keywords, such as IF, THEN, ELSE, THENIF, and ELSEIF, as shown in FIG. 9. For example, the first sentence 148 in the table identifies a conditional statement to take the action to return the transaction to the customer if there is an error with the transaction. Next, the sentence is converted to DSL 150 for the graph visualizer module to generate a portion of the diagram 152 for the first sentence 148. The second sentence 154 is converted next to DSL 156 that is used to generate a second portion of the diagram 158 for the second sentence 154.

Figure 10:
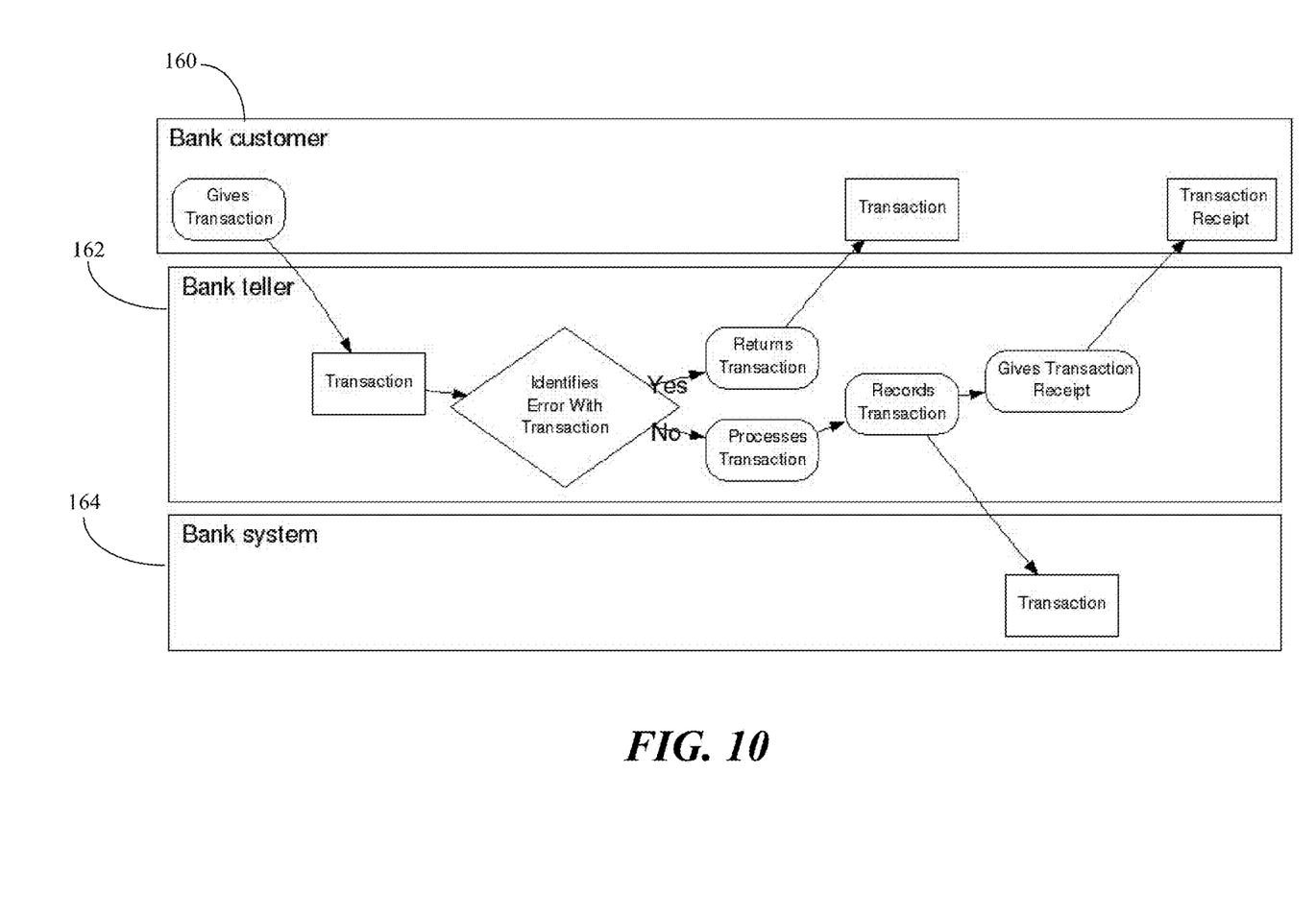
FIG. 10 is an example of a horizontal orientation of a graph indicating a conditional flow process.

Referring now to FIG. 10, the final diagram of the process is illustrated and indicates the direction of flow through the process. This includes the conditional statement of identifying an error and the direction of flow through the process. In summary, the method and system that generates the final diagram includes reading the originating textual description of a process, dividing the description into individual flow steps (or activities, sentences, etc.), and transmitting each step to a database. In addition, the method and system includes providing a DSL annotation from the database or indicating that a new DSL annotation is required because an exiting DSL annotation for a particular step has not been yet created. If a new DSL annotation is required, the annotation may be generated automatically using an algorithm or may be manually generated by a process expert and the new annotation is saved and updated in the database.

The algorithm automatically generates an annotation for a new sentences if the new sentence is "syntactically similar" to one or more sentences already in the database. This feature allows the same "expert annotations" to be applied to the processing of other sentences that are similar to the specific sentences that were annotated by a process expert. For each sentence in the database, the system algorithm creates a "parse tree" similar to that shown in FIGS. 3-5, which is used to facilitate the identification of syntactically similar sentences. The parse tree shows how the sentences (S) are constructed from noun phrases (NP), verb phrases (VP), prepositional phrases (PP), and other parts of speech. A "DSL Generation Rule" is also included in the database for each sentence. The DSL Generation Rule describes how to generate an annotation from the sentence's parse tree. The system algorithm uses the DSL Generation Rule from a syntactically similar sentence, to automatically generate the DSL annotations for the new sentence. The DSL Generation Rule contains placeholders (such as $NP_1$) to specify which parts of the new sentence to include in the generated DSL.

Figure 11:
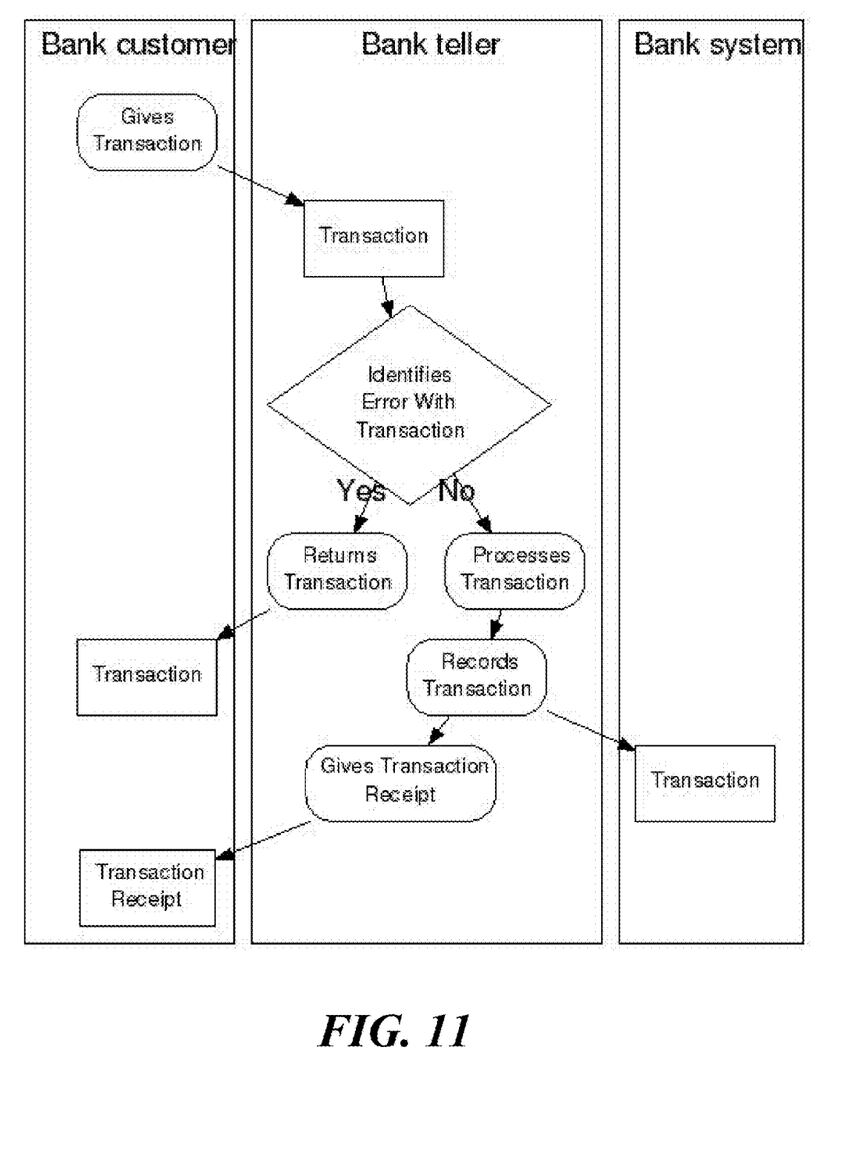
FIG. 11 is an example of a vertical orientation of a graph showing the same flow process of FIG. 10.

The graph visualizer module may use the features in Graphviz to allow the user to specify a horizontal orientation such as left-to-right placement of the diagram shapes, and/or a vertical orientation such as top-to-bottom placement of the diagram shapes. A horizontal orientation is illustrated in FIG. 10 and a vertical orientation is illustrated in FIG. 11. The method and system operates the same in either orientation and is simply user preference.

The method and system to generate process flow diagrams may include a process expert (or multiple experts), or algorithm, reviewing the originating user's natural language descriptions or process flow description. Each process flow step is reviewed individually. For the flow steps that are determined to be valid, the method and system prepares a flow diagram annotation by constructing a textual representation of the diagram using DSL retrieved from the database for a particular step. For the flow steps that are invalid or unable to locate an existing annotation for the flow step, the method and system prepares an annotation and/or a suggested correction for the invalid or new flow step.

In a particular embodiment, the method and system uses a "social network" to control the exchange of information between the originating user and the process experts The phrase "social network" relates to the manner in which the "expert annotations" are accessed in the database. In a social network, a mechanism called a "social graph" is used to describe how the different pieces of information in the database are accessed, and by whom. In the method and system described herein, each "process expert" is a node in the social graph. The process expert may add connections (in the social graph) to other process experts. This creates links between various nodes in the graph, which define "information sharing" rules between process experts.

When an originating user submits a process flow description to the system, the user may specify the process expert, whose annotations they prefer. Since multiple process experts are performing the on-going database maintenance, there exists the possibility that some expert annotations will "be better or more accurate" than others. The social graph allows each process expert to create links only to other process experts, whose annotations they approve. In this way, the originating user is assured that his process flow description will be processed using only the annotations created by his preferred process expert, and the annotations created by an "approved" list of other process experts.

The method and system may divide the description into individual flow steps and send a flow step search request to the database. The database returns a DSL annotation or an unavailable status to the system. If the method and system receives an unavailable status, then the individual flow step is sent to the process expert or to be processed automatically by an algorithm. The process expert (or algorithm) examines each flow step and determines if they are acceptable. If the method and system accepts the flow step then a DSL annotation is created for the flow step, and entered into the database. The method and system processes the annotations and generates process flow diagrams and suggestions. The system stores the annotated flows in a database. Otherwise, the process expert or algorithm enters an error annotation into the system. For example, for flow steps that are invalid, the method and system prepares an error annotation, and optionally a suggested correction for the invalid flow step. For flow steps that cannot be determined to be valid or invalid, no annotations are prepared, and the flow step is omitted from the generated diagram.

Figure 12:
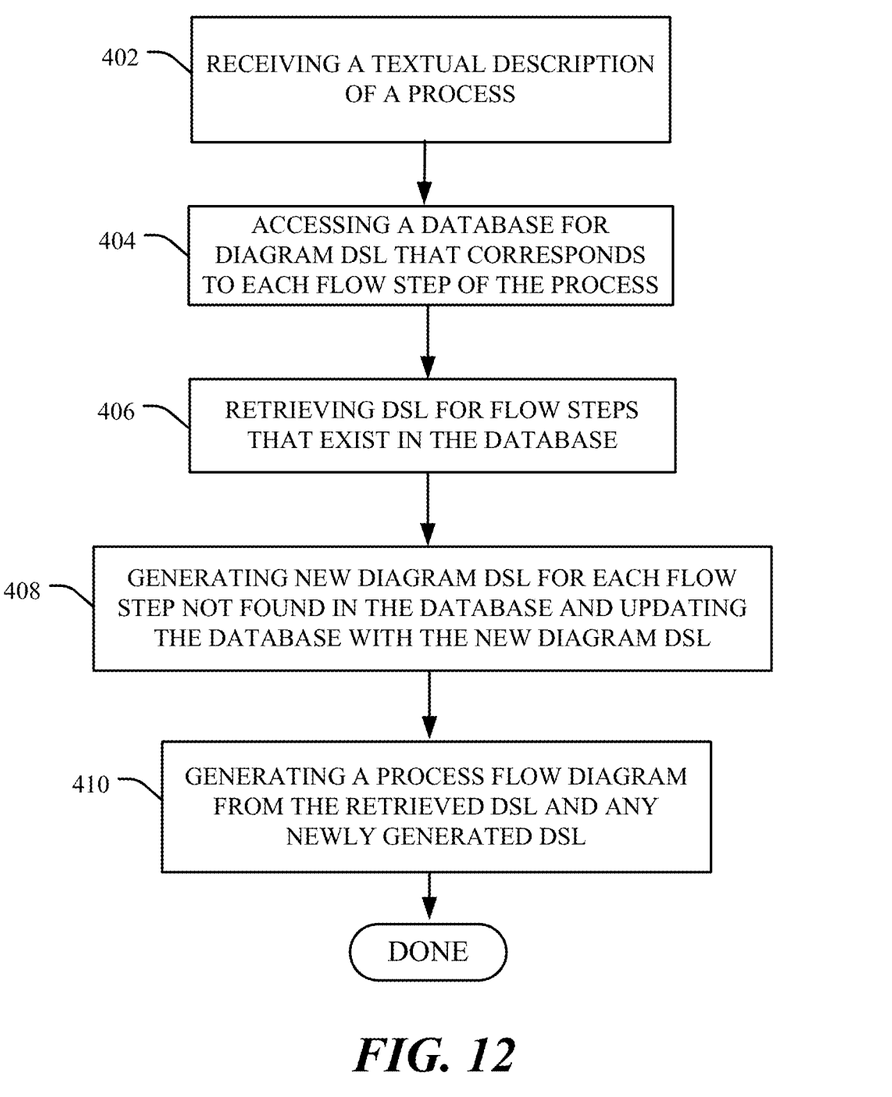
FIG. 12 is a flow diagram of a particular illustrative embodiment of a method to generate a process flow diagram.

Referring now to FIG. 12, a method to generate process flow diagrams is illustrated. The method includes receiving a textual description of a process, at 402. Moving to 404, the method includes accessing a database for diagram DSL that corresponds to each flow step of the process. In addition, the method includes retrieving DSL for flow steps that exist in the database, at 406, and generating new diagram DSL, at 408, for each flow step not found in the database. Continuing to 410, the method also includes updating the database with the new diagram DSL and generating a process flow diagram from the retrieved DSL and any newly generated DSL, at 412.

Figure 13:
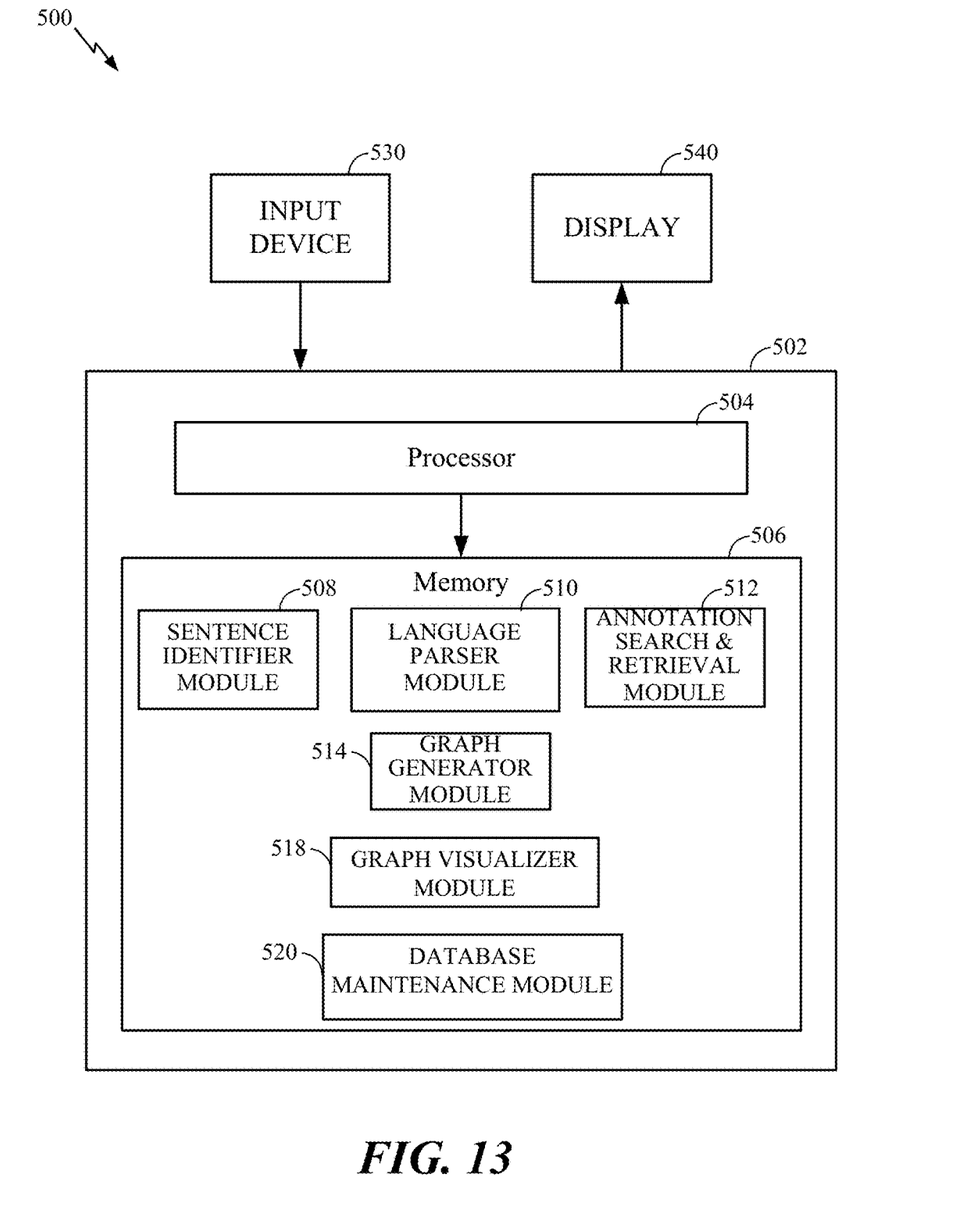
FIG. 13 is a block diagram of an illustrative embodiment of a system to generate a process flow diagram.

Referring now to FIG. 13, an input device 530 and a display 540 are coupled to the device 502. In a particular embodiment, the input device 530 may include a keyboard, a pointing device, a touch screen, a speech interface, another device to receive user input, or any combination thereof. A display 540 may be in direct communication with the processor 504, for displaying the graphs, charts and automated statements identifying the rules that were violated, errors, and also for identifying flow steps that may be missing.

The modules 508, 510, 512, 514, 518, and 520 may be implemented in hardware, firmware, software, other programmable logic, or any combination thereof. The memory 506 includes media that is readable by the processor 504 and that stores data and program instructions of the software modules 508, 510, 512, 514, 518 and 520 that are executable by the processor 504. Additionally, the system 500 may include a display 540, for example, a cathode ray tube (CRT) display, liquid crystal display (LCD), light emitting diode (LED) display, plasma display, or other display device that is accessible to the processor 504.

Figure 14:
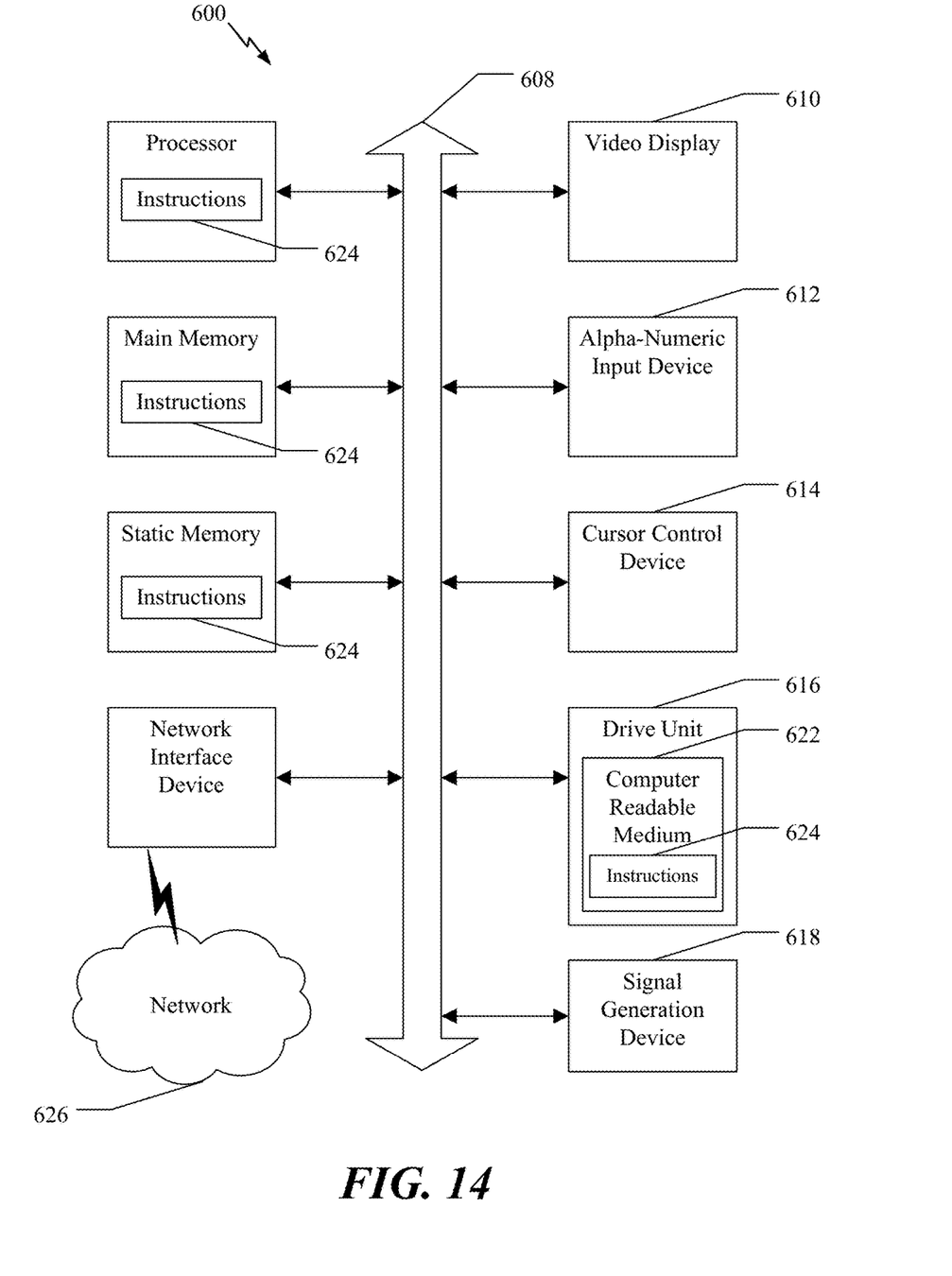
FIG. 14 is a block diagram of an illustrative embodiment of a general computer system.

Referring to FIG. 14, an illustrative embodiment of a general computer system is shown and is designated 600. The computer system 600 can include a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices.

In a networked deployment, the computer system may operate in the capacity of a server, such as a video server or application server, or a media device. The computer system 600 can also be implemented as or incorporated into various devices, such as a personal computer (PC), a personal digital assistant (PDA), a mobile device, a tablet computer, a laptop computer, a desktop computer, a communications device, a wireless telephone, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 14, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), a flat panel display, a solid-state display, or a cathode ray tube (CRT). Additionally, the computer system 600 may include an input device 612, such as a keyboard, and a cursor control device 614, such as a mouse or a touch screen. The computer system 600 can also include a disk drive unit 616, a signal generation device 618, such as a speaker or remote control, and a network interface device 620.

In a particular embodiment, as depicted in FIG. 14, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art excluding signals. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined herein.

Now that the invention has been described,

What is claimed is:

1. A method to generate a process flow diagram, the method comprising:
receiving a textual description of a process from an originating user at a remote terminal, wherein the textual description includes at least one actor and one or more activities;
transmitting the textual description of the process to network servers using a network;
analyzing the textual description at the network servers using an analysis module to detect whether there is an error in the textual description of the process;
searching a database containing predefined rules to find syntactically similar sentences in the database used in the textual description of the process;
using a social graph to control access to the database, wherein the social graph determines the information of the database that is accessed;
creating a connection between the originating user and a selected process expert that the originating user prefers to create expert annotations;
creating links by the selected process expert to other process experts whose annotations the selected process expert approves in order to provide that the process flow description is processed using expert annotations created by the selected process expert and by the other process experts that the selected process expert created links to;
generating an annotated textual description according to a set of predefined rules and the expert annotations that corrects any errors that were detected in the textual description;
generating a process flow diagram from the annotated textual description using a graph generation module; and
transmitting the process flow diagram to the originating user using the network.

2. The method of claim 1, further comprising identifying actors of the textual description to use in generating a respective actor column of the process flow diagram.

3. The method of claim 2, further comprising identifying data objects of the textual description to use in generating the process flow diagram.

4. The method of claim 3, further comprising placing each activity of the one or more activities within the respective actor column of the process flow diagram.

5. The method of claim 4, further comprising generating an association link between the one or more activities, the data objects, or any combination thereof.

6. The method of claim 5, wherein the network is used to interconnect the remote terminal and network servers.

7. The method of claim 6, wherein the association link identifies a direction of flow of the one or more activities.

8. The method of claim 7, further comprising:
implementing a domain specific language (DSL) generation rule in the database, wherein the DSL generation rule generates a DSL annotation from a sentence's parse tree;
automatically generating the DSL annotation for a new sentence from the syntactically similar sentence found in the database using an algorithm; and
providing placeholders to specify which parts of the new sentence to include in the DSL annotation.

9. The method of claim 8, further comprising:
recording sentences in the textual description that do not have expert annotations; and
adding missing expert annotations to the database to maintain the database manually, automatically, or any combination thereof.

10. The method of claim 9, wherein the predefined rules include detecting missing objects, missing actors, flow breaks, missing conditionals, incomplete conditional flow paths, or any combination thereof.

11. The method of claim 10, wherein the association link identifies a transfer of the data object to a different actor.

12. A method to generate a process flow diagram, the method comprising:
transmitting a textual description of a process over a network from a remote terminal to at least one network server logged in to the network;
searching a database containing predefined rules to find syntactically similar sentences in the database used in the textual description of the process, wherein expert annotations corresponding to the syntactically similar sentences are applied to sentences of the textual description that are syntactically similar;
using a social graph to control access to the database, wherein the social graph selects information of the database that is accessed;
creating a connection between an originating user and a selected process expert that the originating user prefers to create expert annotations;
creating links by the selected process expert to other process experts whose annotations the selected process expert approves in order to provide that the process flow description is processed using expert annotations created by the selected process expert and by the other process experts that the selected process expert created links to;
generating a process flow diagram from the annotated textual description using a graph generation module at the network server; and
transmitting the process flow diagram to the originating user using the network.

13. The method of claim 12, further comprising identifying actors of the textual description to use in generating a respective actor column of the process flow diagram for each of the actors.

14. The method of claim 13, further comprising identifying data objects of the textual description to use in generating the process flow diagram and placing each data object in the respective actor column.

15. The method of claim 14, further comprising placing each activity of the one or more activities within the respective actor column of the process flow diagram.

16. The method of claim 15, further comprising:
identifying decisions that are made in the process; and
placing a representative decision block within the respective actor column of the process flow diagram to indicate a decision or condition dictates which association link is followed in the process.

17. The method of claim 16, further comprising generating the association link between the one or more activities, the data objects, decision block, or any combination thereof.

18. The method of claim 17, wherein the association link identifies a direction of flow of the process.

19. The method of claim 18, wherein the predefined rules include detecting missing objects, missing actors, flow breaks, missing conditionals, incomplete conditional flow paths, or any combination thereof.

20. The method of claim 19, wherein the association link identifies a transfer of the data object to a different actor.

21. A computer program product for generating a process flow diagram, the computer program product embodied on one or more computer-readable media excluding signals and comprising:
computer-readable program code means for receiving a textual description of a process at a remote terminal transmitted from an originating user, wherein the textual description includes one or more activities;
computer-readable program code means for transmitting the textual description of the process to network servers using a network;
computer-readable program code means for searching a database containing predefined rules to find syntactically similar sentences in the database used in the textual description of the process, wherein expert annotations corresponding to the syntactically similar sentences are applied to sentences of the textual description that are syntactically similar;
computer-readable program code means for using a social graph to control access to the database, wherein the social graph selects information of the database that is accessed;
computer-readable program code means for creating a connection between the originating user and a selected process expert that the originating user prefers to create expert annotations;
computer-readable program code means for creating links by the selected process expert to other process experts whose annotations the selected process expert approves in order to provide that the process flow description is processed using expert annotations created by the selected process expert and by the other process experts that the selected process expert created links to;
computer-readable program code means for analyzing the textual description at the network servers using an analysis module to detect whether there is an error in the textual description of the process;
computer-readable program code means for generating an annotated textual description according to a set of predefined rules that corrects any errors that were detected in the textual description;
computer-readable program code means for generating a process flow diagram from the annotated textual description using a graph generation module; and
computer-readable program code means for transmitting the process flow diagram to the originating user using the network.

* * * * *